US010017036B2

(12) United States Patent
Lim et al.

(10) Patent No.: US 10,017,036 B2
(45) Date of Patent: Jul. 10, 2018

(54) PROTECTING DEVICE OF BATTERY FOR ELECTRICAL AUTOMOBILE

(71) Applicant: GM GLOBAL TECHNOLOGY OPERATIONS LLC, Detroit, MI (US)

(72) Inventors: Hyun Soo Lim, Gyeonggi-do (KR); Dong Min Kim, Incheon (KR)

(73) Assignee: GM Global Technology Operation LLC, Detroit, MI (US)

( * ) Notice: Subject to any disclaimer, the term of this patent is extended or adjusted under 35 U.S.C. 154(b) by 0 days.

(21) Appl. No.: 15/293,714

(22) PCT Filed: Mar. 26, 2015

(86) PCT No.: PCT/KR2015/002989
§ 371 (c)(1),
(2) Date: Oct. 14, 2016

(87) PCT Pub. No.: WO2015/160108
PCT Pub. Date: Oct. 22, 2015

(65) Prior Publication Data
US 2017/0043654 A1    Feb. 16, 2017

(30) Foreign Application Priority Data
Apr. 16, 2014  (KR) ........................ 10-2014-0045476

(51) Int. Cl.
*B60K 1/04*      (2006.01)
*B62D 21/15*    (2006.01)
*B62D 29/00*    (2006.01)

(52) U.S. Cl.
CPC .............. *B60K 1/04* (2013.01); *B62D 21/157* (2013.01); *B62D 29/007* (2013.01);
(Continued)

(58) Field of Classification Search
None
See application file for complete search history.

(56) References Cited

U.S. PATENT DOCUMENTS 5,833,023 A  *  11/1998  Shimizu ................. B62D 21/00
                                                                180/68.5
8,833,839 B2 *   9/2014  Young ..................  B62D 21/157
                                                                296/187.08
(Continued)

FOREIGN PATENT DOCUMENTS

DE      10 2011 102412 A1    11/2012
DE      10 2012 000622 A1     7/2013
(Continued)

*Primary Examiner* — John D Walters
*Assistant Examiner* — Hilary L Johns
(74) *Attorney, Agent, or Firm* — McNees Wallace & Nurick LLC

(57) ABSTRACT

The present disclosure relates to a protecting device; for protecting a battery effectively by absorbing an impact energy which can be received from a lateral direction of an electrical automobile; and for preventing a secondary damage due to the breakage of the battery, and the present disclosure relates to the battery protecting device of the electrical automobile including: a frame (10) for forming a body of a floor (30) positioned in a lower portion of the electrical automobile (100); and at least one protecting bar (20) positioned inside the frame (10), and the vertical cross-section of the protecting bar (20) is a shape including: a pair of closed spaces (21); and a brim (22) for forming the pair of closed spaces (21), in which the brim (22) is connected between the pair of closed spaces (21) so as to make the pair of closed spaces (21) separated by a predetermined distance. In the present disclosure, the impact energy received from outside, especially the impact energy from the lateral side of the electrical automobile, can be transmitted to, and absorbed by: an impact-absorbing member installed in the lower portion of the electrical automobile; and the protecting bars of a specific shape, thereby preventing the breakage of the battery effectively.

8 Claims, 3 Drawing Sheets

(52) U.S. Cl.
CPC ... *B60K 2001/0438* (2013.01); *B60Y 2200/91* (2013.01); *B60Y 2306/01* (2013.01); *B60Y 2400/112* (2013.01)

(56) References Cited

U.S. PATENT DOCUMENTS

| | | | | |
|---|---|---|---|---|
| 9,187,136 | B1* | 11/2015 | Leanza | B62D 25/20 |
| 9,487,239 | B2* | 11/2016 | Schnug | B62D 25/04 |
| 9,505,442 | B2* | 11/2016 | Wu | B62D 21/157 |
| 2006/0289224 | A1 | 12/2006 | Ono et al. | |
| 2008/0007089 | A1* | 1/2008 | Bachmann | B62D 21/157 |
| | | | | 296/187.08 |
| 2009/0152034 | A1* | 6/2009 | Takasaki | B60K 1/04 |
| | | | | 180/68.5 |
| 2012/0175177 | A1* | 7/2012 | Lee | B60K 1/04 |
| | | | | 180/68.5 |
| 2012/0175897 | A1* | 7/2012 | Rawlinson | B62D 21/152 |
| | | | | 293/132 |
| 2013/0270863 | A1* | 10/2013 | Young | B62D 21/157 |
| | | | | 296/187.12 |

FOREIGN PATENT DOCUMENTS

| | | |
|---|---|---|
| JP | 11-042465 | 9/2000 |
| KR | 10-2012-0050234 A | 5/2012 |
| KR | 10-2012-0055806 A | 6/2012 |
| KR | 10-2012-0129790 A | 11/2012 |
| KR | 10-2014-0034505 A | 3/2014 |

* cited by examiner

[Fig. 1]
100
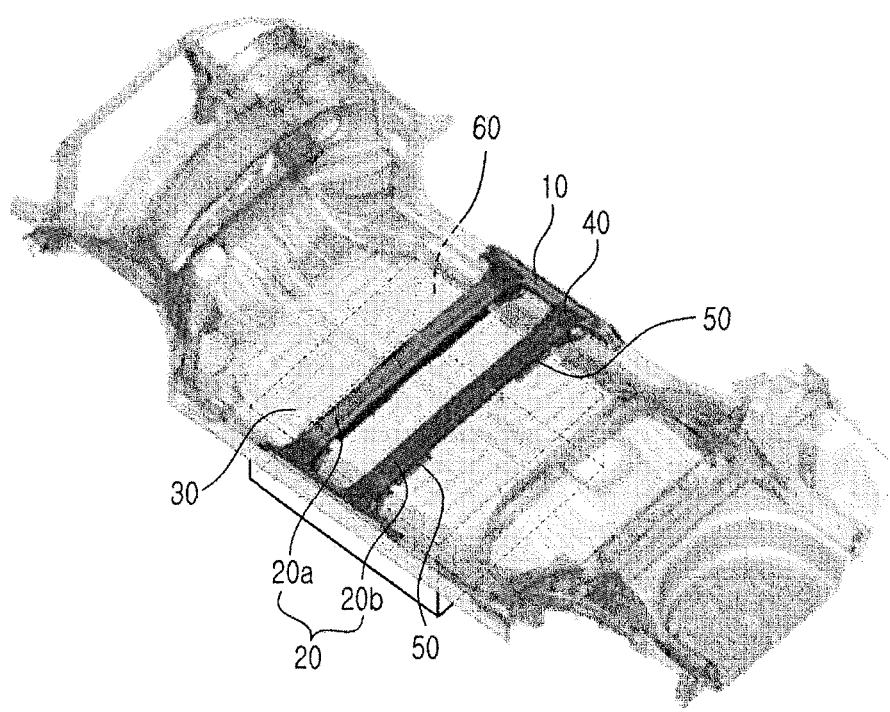
[Fig. 2]
20
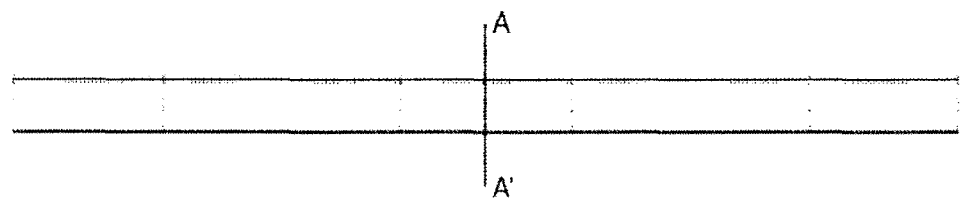

[Fig. 3]
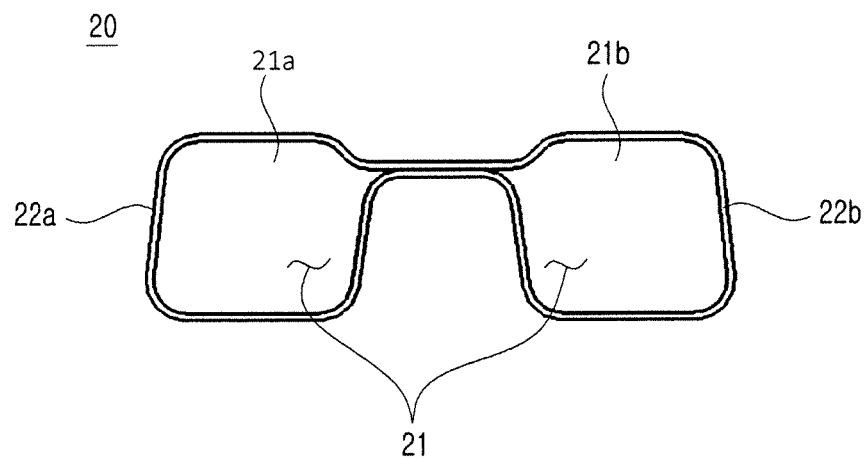
[Fig. 4]
20
Bend Radius -> 3000mm ~ 70000mm

[Fig. 5]
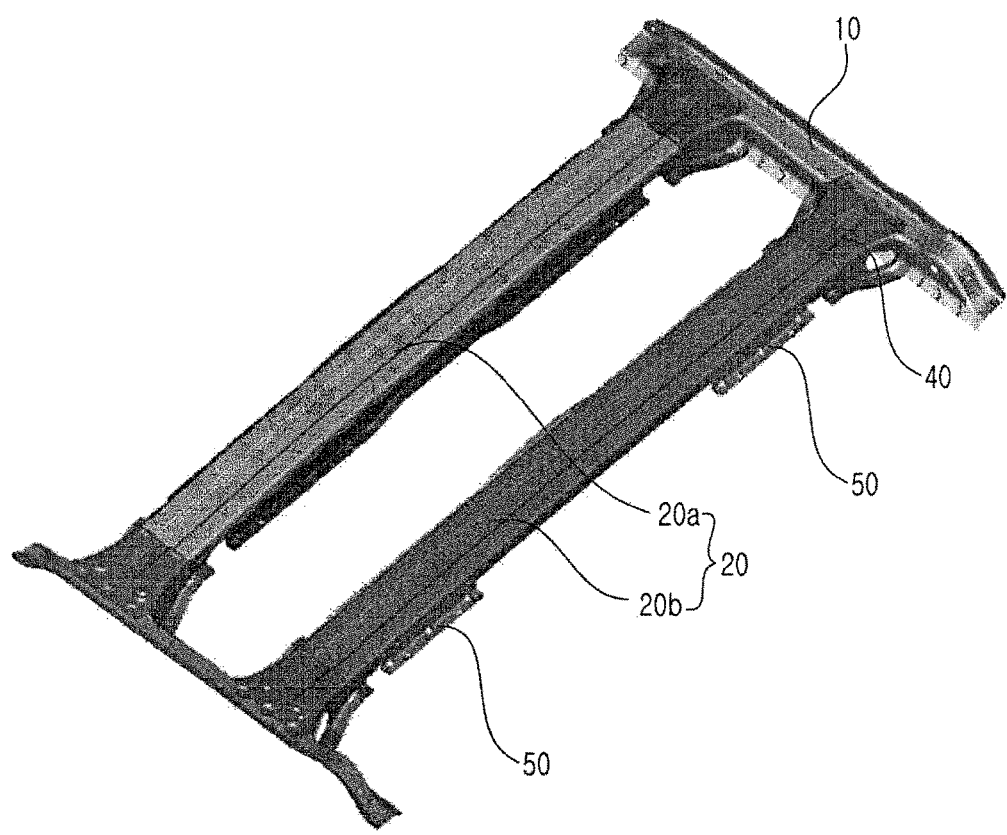

PROTECTING DEVICE OF BATTERY FOR ELECTRICAL AUTOMOBILE

TECHNICAL FIELD

The present disclosure relates to a protecting device of a battery for an electrical automobile, and more particularly, to a protecting device configured to effectively protect a battery by absorbing an impact energy that an electrical automobile may receive in a lateral direction, and to prevent a secondary damage by the breakage of the battery.

BACKGROUND ART

As one of environment protection solutions to reduce air pollution, automobile manufacturers have launched electrical automobiles. Unlike conventional automobiles, the electrical automobile is provided with an electric motor such that it receives electricity from a battery and uses it as power. Meanwhile, the battery used in such automobile is more susceptible to fire by breakage than the existent automobiles, and this means that there is a greater risk of secondary damages. Therefore, a battery protecting device is a very important part of such electrical automobile, and it has to be effective enough.

A general conventional battery case or protecting device for protecting the battery of an electrical automobile has been manufactured in various forms of protecting devices that are installed in a lower portion of the electrical automobile and that prevent the breakage of the battery when collision on the lateral sides occurs. The recently launched protecting devices have simpler structure and at the same time, have reduced weight and manufacturing cost.

For example, Korean Patent Publication No. 2012-0050234 provides a structure including a plurality of steel reinforcement brackets on an inner bottom surface of a battery case that houses therein a battery, a plurality of steel square beams on an outer bottom surface to support the battery case, and mounting brackets at ends thereof. These steel reinforcement brackets and square beams are configured to prevent damages and breakages of the battery from external impact, by greatly increasing lateral stiffness of the battery case. However, the reinforcement brackets and square beams fixed as described above are installed on not only the upper portion of the battery case, but also the lower portion of the battery case. This means that additional process is required, thus decreasing economic efficiency. Further, the overall weight increases, thus resulting in a problem of reduced distance to empty.

Korean Patent Publication No 2014-0034505 provides a protecting device characterized by a reinforcement assembly installed in a case body that houses a battery therein, which has an uneven structure to absorb impact energy. By using such protecting device, effects of reduced weight and reduced cost are obtained. Further, simpler structure allows various advantages including ease of application in various types of vehicles. However, in order to obtain the effects described above, the precondition is necessary that the depth or the width of the uneven structure in use should be adjusted to match each type of electrical automobile or each circumstance. If the shapes and the sizes of the uneven structure of the protecting device have to be determined and fabricated to match each type of electrical automobile or each circumstance, even if the amount of materials used is reduced and the cost is reduced, it would inevitably increase difficulty of mass production and therefore, increase the unit price.

Accordingly, the related technology for a protecting device that prevents a battery for an electrical automobile from breakage from external impact energy suffers several limitations such as increased overall weight of the electrical automobile due to many structure components added to ensure protective effect, or even when the structure is far simpler, economic efficiency deteriorates because fabrication thereof requires customization for each automobile type or circumstance.

DISCLOSURE OF INVENTION

Technical Problem

The present disclosure has been made to overcome the problems occurring in the art, and accordingly, it is an object of the present disclosure to provide a protecting device of a battery for an electrical automobile, which is capable of absorbing an impact energy that may be received from outside, or more specifically, absorbing an impact energy from lateral side of the electrical automobile more effectively.

Further, it is an object of the present disclosure to provide a protecting device which is more economical, because the protecting device has a simpler installation process than a conventional protecting device, and is mass producible.

Further, it is an object of the present disclosure to provide a protecting device which is applicable for a variety of electrical automobiles and circumstances and thus is mass producible, and in which locations of, or a number of protecting bars are easily changed according to need of a manufacturer.

Solution to Problem

In an embodiment of the present disclosure, in order to solve the problems mentioned above, a protecting device of a battery for an electrical automobile is provided, including a frame positioned in a lower portion of the electrical automobile 100, and one or more protecting bars positioned inside the frame 10, in which a vertical cross-section of the protecting bars 20 has a shape that includes at least two closed spaces 21a, 21b, and brims 22a, 22b that form the closed spaces 21a, 21b, the at least two closed spaces 21a, 21b are separated apart from each other, and the brims 22a, 22b are connected to each other.

Further, the vertical cross-section is preferably in such a shape that the brims 22a, 22b are connected at a location where one side of each of the closed spaces 21a, 21b faces each other.

Further, the one or more protecting bars 20 preferably have a predetermined bend radius.

Further, the one or more protecting bars 20 preferably have an upwardly-bent bend radius.

Further, the one or more protecting bars 20 preferably have a bend radius in a range of 3000 mm and 7000 mm.

Further, the one or more protecting bars 20 are two protecting bars 20a, 20b, and the two protecting bars 20a, 20b preferably have different bend radii from each other.

Further, an impact absorbing member 40 is positioned between the one or more protecting bars 20 and the frame 10.

Further, the one or more protecting bars 20 are preferably positioned in an upper portion of a battery mounted to the electrical automobile 100.

Further, a material of the one or more protecting bars 10 preferably is a martensitic steel having a strength in a range of 900 Mpa and 1700 Mpa.

Effects

As described above, according to the present disclosure, the impact energy received from outside, or more specifically, the impact energy received from lateral side of the electrical automobile is transmitted to the impact absorbing member and protecting bars of unique shapes disposed and installed in a lower portion of the electrical automobile and absorbed therein such that breakages of the battery are prevented effectively.

Further, the present disclosure does not need complicated assembly process and thus has simpler installation process than related protecting devices, and is more economical because constituent elements are mass producible.

Further, because it is possible to apply the protecting bars to various types of electrical automobiles and circumstances by cutting the protecting bars into a desired length or by additionally increasing the number of the protecting bars, the protecting bars can be easily changed in shape according to need of a manufacturer, and are economical and convenient to manufacture.

BRIEF DESCRIPTION OF DRAWINGS

FIG. 1 is a perspective view provided to explain a protecting device according to an embodiment of the present disclosure.

FIG. 2 is a plan view provided to explain a protecting bar according to an embodiment of the present disclosure.

FIG. 3 is a cross-sectional view taken along line A-A' of FIG. 2.

FIG. 4 is a side view provided to explain a bend radius of a protecting bar according to an embodiment of the present disclosure.

FIG. 5 is a partially enlarged view of FIG. 1.

BEST MODE FOR THE INVENTION

The constituent elements of a protecting device of a battery for an electrical automobile may be used as an integrated form or separated and used respectively. Further, depending on a form of use, some of the constituent elements may be omitted.

The preferred embodiments of a protecting device of a battery for an electrical automobile according to the present disclosure will be described with reference to FIGS. 1 to 5. In that process, the thicknesses of the lines illustrated in the drawings, sizes of the constituent elements, or the like may be exaggerated for the purpose of clarity and convenience. Further, the terms described below are those that are defined in consideration of the function of the present disclosure, and may be varied according to the intent or the practice of the user or the operator. Accordingly, the definitions of these terms should be described based on the content throughout the disclosure.

1. Description of Configuration of Protecting Device

Hereinbelow, a protecting device of a battery 60 for an electrical automobile according to preferred embodiments of the present disclosure will be described with reference to FIGS. 1 to 5.

According to an embodiment of the present disclosure, the protecting device includes a frame 10 that forms a body of a bottom 30 positioned in a lower portion of an electrical automobile 100, a protecting bar 20 positioned inside the frame 10, an impact absorbing member 40 that connects the protecting bar 20 to the frame 10, and a connector 50 that connects the protecting bar 20 to the bottom 30.

The vertical cross-section of the protecting bar 20 is defined by a pair of closed spaces 21a, 21b, and brims 22a, 22b surrounding these, in which the brims 22a, 22b are characterized of being connected so as to separate the pair of closed spaces 21a, 21b by a predetermined distance (see FIG. 2). By these two closed spaces 21a, 21b and brims 22a, 22b that are formed on right and left sides at a predetermined distance apart from each other, the lateral stiffness of the protecting bar 20 is increased.

It is to be understood that, because the lateral stiffness of the protecting bar 20 is increased by the closed spaces 21a, 21b and the brims 22a, 22b of the protecting bar 20, compared with the related technology, the protecting device does not require an increased amount of materials of the protecting device and still is resistant against the impact energy more effectively, and also is advantageous economically. It is to be understood that, in another embodiment, there may be two or more closed spaces 21 according to circumstances.

The shape of the closed spaces 21a, 21b may be circular or bent, or may be modified into a variety of shapes such as a shape having a plurality of sides with rounded or pointed corners, and so on. The brims 22a, 22b that connect these closed spaces 21a, 21b are not limited to any specific shape or number with certain thickness, location of connection, or degree of separating the closed spaces 21a, 21b apart from each other, and so on. Note that, for a location where the brims 22a, 22b are connected, the brims 22a, 22b may be connected closer to a side opposite the side where the protecting bar 20 is connected to the bottom 30, and that the brims 22a, 22b may preferably be connected at a location where one side of each of the closed spaces 21a, 21b faces each other.

The protecting bar 20 has a predetermined bend radius so as not to deliver the impact to the battery 60 even when yielding to the impact energy (see FIG. 4). The bend radius may preferably be in a range of 3000 mm and 70000 mm such that when bent, the protecting bar 20 can be guided to be protruded in a direction opposite the place where the battery 60 is positioned, by which the safety is added. The protecting bar 20 may additionally include the connector 50, which may act to restrict the protecting bar 20 to be connected to the bottom 30 more firmly, thus limiting a degree of bending when yielding to the impact energy.

A plurality of same protecting bars 20 may be used for the protecting bar 20 that constitutes the protecting device 20, but the different forms may be used according to embodiments. The protecting bars 20a, 20b with different characteristics from each other may have different vertical cross-sectional shapes, or may have different bend radii from each other.

When the protecting bar 20 is installed in the frame 10, the impact absorbing member 40 is positioned on both ends of each protecting bar, thus connecting the frame 10 with the protecting bar 20. The frame 10 is a constituent element that forms a body of the electrical automobile and also particularly determines the shape of the bottom 30. The frame 10 is configured with a material that has good durability and that is hardly deformable. By positioning the protecting bar 20 between the impact absorbing members 40 instead of installing the same directly in the frame 10, a protecting device in a more advantageous form to absorb the impact energy may be configured.

Further, it is of course possible that the protecting bar 20 can be installed in a lower portion or an upper portion of the battery 60 as mounted to the electrical automobile 100. Preferably, a more effective arrangement may be provided by positioning the battery 60 between the bottom 30 and the protecting bar 20, and installing the protecting bar 20 in an upwardly-bent form in the frame 10.

The materials for the protecting bar 20, the frame 10 or the impact absorbing member 40 are not limited to any specific material. Note that the protecting bar 20 may preferably be a martensitic steel having a strength in a range of 900 Mpa and 1700 Mpa.

What is claimed is:

1. A protecting device of a battery for an electrical automobile, comprising:
    a frame positioned in a lower portion of the electrical automobile, and one or more protecting bars positioned inside the frame, the one or more protecting bars extending in the frame from a first side of the automobile to an opposed second side of the automobile, wherein
    a vertical cross-section of the one or more protecting bars has a shape that includes at least two closed spaces which extend through a length of the one or more protecting bars, and brims that form the closed spaces, longitudinal axes of the one or more protecting bars extend transversely to a longitudinal axis of the electrical automobile,
    the at least two closed spaces are spaced apart from each other,
    the brims are connected to each other, and
    an impact absorbing member is positioned between the one or more protecting bars and the frame.

2. The protecting device of claim 1, wherein the brims are connected at a location between the at least two closed spaces.

3. The protecting device of claim 1, wherein the one or more protecting bars have a bend radius.

4. The protecting device of claim 3, wherein the one or more protecting bars have an upwardly-bent bend radius as measured across the length of the one or more protecting bars.

5. The protecting device of claim 4, wherein the one or more protecting bars have a bend radius in a range of 3000 mm and 7000 mm.

6. The protecting device of claim 3, wherein the one or more protecting bars are two protecting bars, and the two protecting bars have different bend radii from each other.

7. The protecting device of claim 1, wherein the one or more protecting bars are positioned in an upper portion of a battery mounted to the electrical automobile.

8. The protecting device of claim 1, wherein a material of the one or more protecting bars is a martensitic steel having a strength in a range of 900 Mpa and 1700 Mpa.

* * * * *